United States Patent
Sizikov et al.

(10) Patent No.: US 9,368,954 B1
(45) Date of Patent: Jun. 14, 2016

(54) ELECTRICAL PROTECTION AND SENSING CONTROL SYSTEM

(71) Applicant: Google Inc., Mountain View, CA (US)

(72) Inventors: Gregory Sizikov, Cupertino, CA (US); Craig Mason Kaneshiro, San Jose, CA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 14/493,587

(22) Filed: Sep. 23, 2014

(51) Int. Cl.
H02H 3/20 (2006.01)
H02H 9/04 (2006.01)
H02H 1/00 (2006.01)
H02H 7/20 (2006.01)

(52) U.S. Cl.
CPC ............... H02H 1/0007 (2013.01); H02H 7/20 (2013.01)

(58) Field of Classification Search
CPC .................................. H02H 3/20; H02H 7/18
USPC ............................................................ 361/86
See application file for complete search history.

(56) References Cited

U.S. PATENT DOCUMENTS

| | | | | |
|---|---|---|---|---|
| 3,729,656 A * | 4/1973 | Luquain | ................. | H02H 3/046 340/638 |
| 6,172,482 B1 * | 1/2001 | Eguchi | ..................... | H02H 7/18 320/134 |
| 6,268,713 B1 * | 7/2001 | Thandiwe | ............. | H02J 7/0031 320/134 |
| 6,906,557 B1 | 6/2005 | Parker | | |
| 7,371,091 B2 | 5/2008 | Kojori | | |
| 7,538,519 B2 * | 5/2009 | Daou | ..................... | H02J 7/0031 320/116 |
| 7,742,352 B1 | 6/2010 | Hara | | |
| 7,884,495 B2 | 2/2011 | Kojori | | |
| 8,363,373 B2 | 1/2013 | Atluri | | |
| 8,564,023 B2 | 10/2013 | Im | | |
| 2011/0026177 A1 * | 2/2011 | Atluri | ................... | G11C 29/027 361/56 |
| 2011/0273137 A1 * | 11/2011 | Nakatsuji | ................ | H01M 2/34 320/107 |
| 2015/0138681 A1 * | 5/2015 | Mayes | ................... | B64D 41/00 361/93.7 |

FOREIGN PATENT DOCUMENTS

EP 1870965 A1 12/2007

* cited by examiner

*Primary Examiner* — Dharti Patel
(74) *Attorney, Agent, or Firm* — Fish & Richardson P.C.

(57) ABSTRACT

An apparatus for providing electrical protection and reducing power consumption in data centers. In an aspect, an apparatus includes a hot swap control circuit that monitors a voltage drop across a fuse, and selectively connects a bus bar to a load, based on the monitored voltage. Further, the apparatus selectively disconnects the bus bar from the load when the hot swap control circuit indicates that the monitored voltage across the fuse has attained a voltage threshold.

14 Claims, 2 Drawing Sheets

ELECTRICAL PROTECTION AND SENSING CONTROL SYSTEM

BACKGROUND

Data centers are often used by providers to deliver computing services to users. A data center, such as a server farm, typically contains hundreds or thousands of processing devices. Within the data centers the processing devices are arranged in clusters. Each cluster is configured to perform a distributed task in a parallel fashion. Naturally, the data centers consume a large amount of power, and the amount of power consumed by data centers is directly related to the expense of operation and efficiency.

Moreover, data centers contain many different types of electrical devices and elements that may be expensive to replace. Therefore, protection circuits and devices are used to protect the devices and elements of data centers. One such protection circuit is a hot swap controller. A hot swap controller facilitates addition of electrical devices to a system without removing power from other electrical devices in the system, while providing electrical protection for the electrical devices. An example use of a hot swap controller is in a server rack, where server devices may be added by inserting the server devices while other server devices in the server rack and on the same power bus remain powered. When the server device is coupled to the server rack, and thus to the power bus, the hot swap controller monitors the supply voltage and other conditions, such as current, and can control the power up of the server device so as to avoid transients, such as excessive inrush currents. Once the server device reaches a powered state that meets a threshold, the hot swap power controller generates a "power good" signal to indicate to the server processor (or other system components) that the server device is now operable.

To monitor the protected circuit, the hot swap controller utilizes a small resistor as a current sense resistor. However, the hot swap circuit does not provide full protection as it may fail to provide short circuit protection. Thus, additional electrical protection is required for the tray housing the devices, such as fuses. These fuses have internal resistances, this is typically on the order of magnitude of the sense resistor, and are connected in series with the resistive load.

SUMMARY

This specification relates to electrical protection circuitry for data centers. In particular, the specification relates to an electrical protection apparatus that improves data centers efficiency and performance.

In general, one innovative aspect of the subject matter described in this specification can be embodied in a system including a plurality of rack slots configured to receive a corresponding electrical device, wherein each rack slot includes: first and second load terminals, the first load terminal configured to be in electrical connection with a first conductor of a power bus; a controller having a plurality of terminals comprising a first sense terminal, a second sense terminal, and a control terminal; a switching device having first and second terminals and a control input, the control input connected to the control terminal of the controller, and the first terminal connected to the second load terminal; a first fuse having a first resistance, and first and second terminals, the first terminal being connected to the power bus and the second terminal being connected to the second terminal of the switching device; wherein the first sense terminal is coupled to the first terminal of the first fuse, and the second sense terminal is coupled to the second terminal of the first fuse, and wherein the controller monitors a voltage across the first fuse and in response generates a control signal on the control input that selectively opens or closes the switching device such that the first and second terminals of the switching device are in electrical connection when the switching device is in a closed state, and are in electrical isolation from each other when the switching device is in an open state. Particular embodiments of the subject matter described in this specification can be implemented so as to realize one or more of the following advantages; protection circuits contribute negatively to the cost of operation of data centers, as they consume power while monitoring the components they protect; however, the protection circuit topology described below reduces the power consumption required for control circuits that implement sense elements. When scaled by thousands of units in a data center, the implementation of the subject matter allow for reduction of power consumption and operational costs of data centers. Additionally, the implementation of the subject matter reduces the number of components on the printed circuit board, which in turn, reduces the overall cost of equipment and preserves space on the printed circuit board.

The details of one or more embodiments of the subject matter described in this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

The subject matter below relates to systems and methods where electrical protection circuitry is used to provide electrical protection for data centers, and to improving the performance and efficiency of data centers. In the examples described below, the protection circuitry is described in the context of a hot swap controller. However, the subject matter can be used for other control-type circuitry that require both sense elements and fuse elements.

The hot swap controller provides electrical protection for electrical devices in data centers. This is achieved by providing a control signal to a switching device that is capable of selectively connecting and disconnecting a bus bar to a tray that, for example, houses the electrical connections for the electrical devices. The hot swap controller selectively connects and disconnects the bus bar from the tray based on a monitored voltage across a sense resistor that is connected between the bus bar and the tray. The hot swap controller utilizes fuses, including a fuse as a sensing element. This eliminates the need for particular circuit elements, such as the sense resistor, and thus reduces the resistance between the bus bar and the tray.

Additional fuses and a resistive load may be provided to a differential input to provide fuse protection. The fuse protection ensures that any connection to the bus bar is fused and therefore protected. However, because the input impedance of a differential input is very high, very little current is drawn (typically only leakage), and thus the overall power consumption is reduced. Accordingly, overall power consumption of data center is reduced.

Figure 1A:
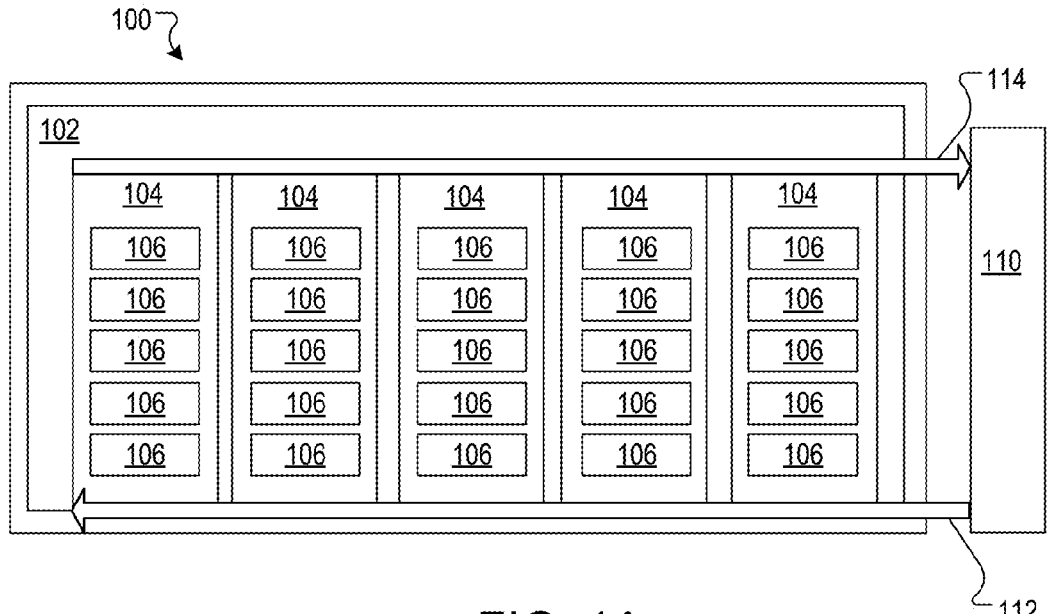
FIGS. 1A and 1B are sectional side and top views of a data center facility.
Figure 1B:
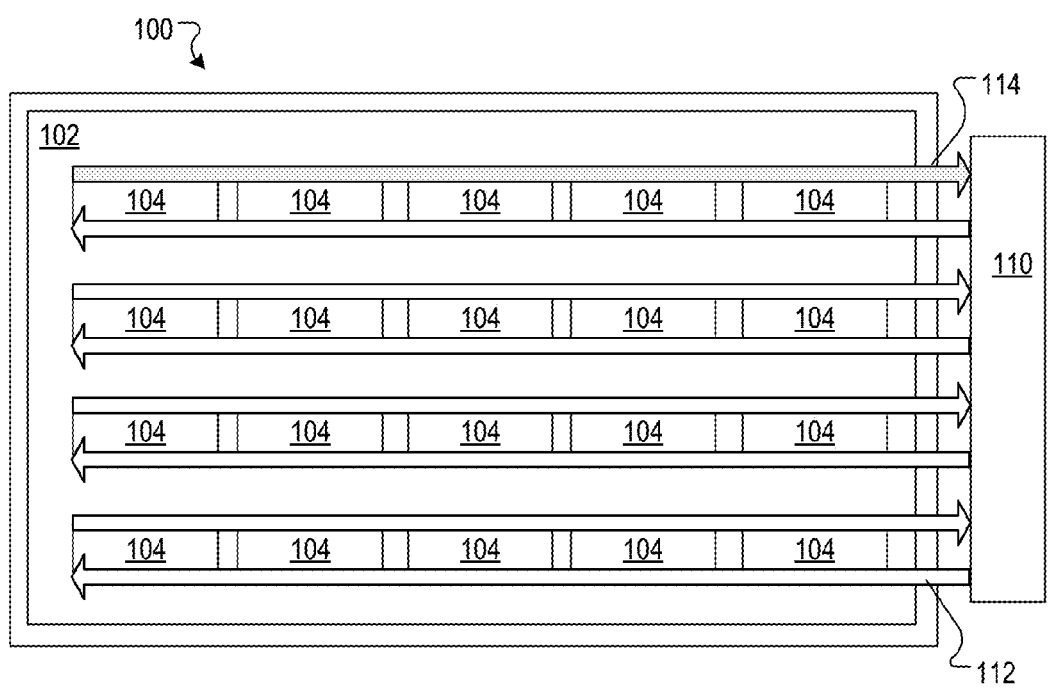

FIGS. 1A and 1B are sectional side and top views of a data center facility 100. The facility 100 includes an enclosed space 102 and can occupy one or more rooms within a building or essentially an entire building. The enclosed space 102 is sufficiently large for installation of numerous (e.g., hundreds or thousands) racks 104 of computer equipment, and may house hundreds, thousands or tens of thousands of computer processing devices.

The rack-mounted computers are arranged in the enclosed space 102 in rows and are separated by aisles. Each rack 104 includes multiple processing devices 106. In some implementations, each processing device 106 includes a motherboard mounted on a tray, on which a variety of additional computer-related components are mounted. The facility 100 includes other computer and routing devices (not shown) to connect the facility to a network, such as the Internet.

The facility 100 is also connected to a power grid 110 to power the processing devices 106 by a power mains bus 112 and return bus 114. The power grid 110 provides power for each rack 104, and in turn, each device 106. In some implementations the power grid 110 provides a voltage of 48V DC. Other data center facilities infrastructure, such as cooling, etc., are also present in the data center.

The power consumed by the facility depends in large part on the number of racks and devices within the facility. Electrical components that increase the power path resistance contribute to power losses in the form of heat, which in turn increases power consumption by the facility in both terms of providing load electricity and cooling electricity. Elimination of such components can lead to a significant reduction in power consumption, especially in larger high power facilities. One example implementation of an electrical protection apparatus that improves data centers efficiency and performance while reducing the power consumption is discussed in detail with reference to FIG. 2.

Figure 2:
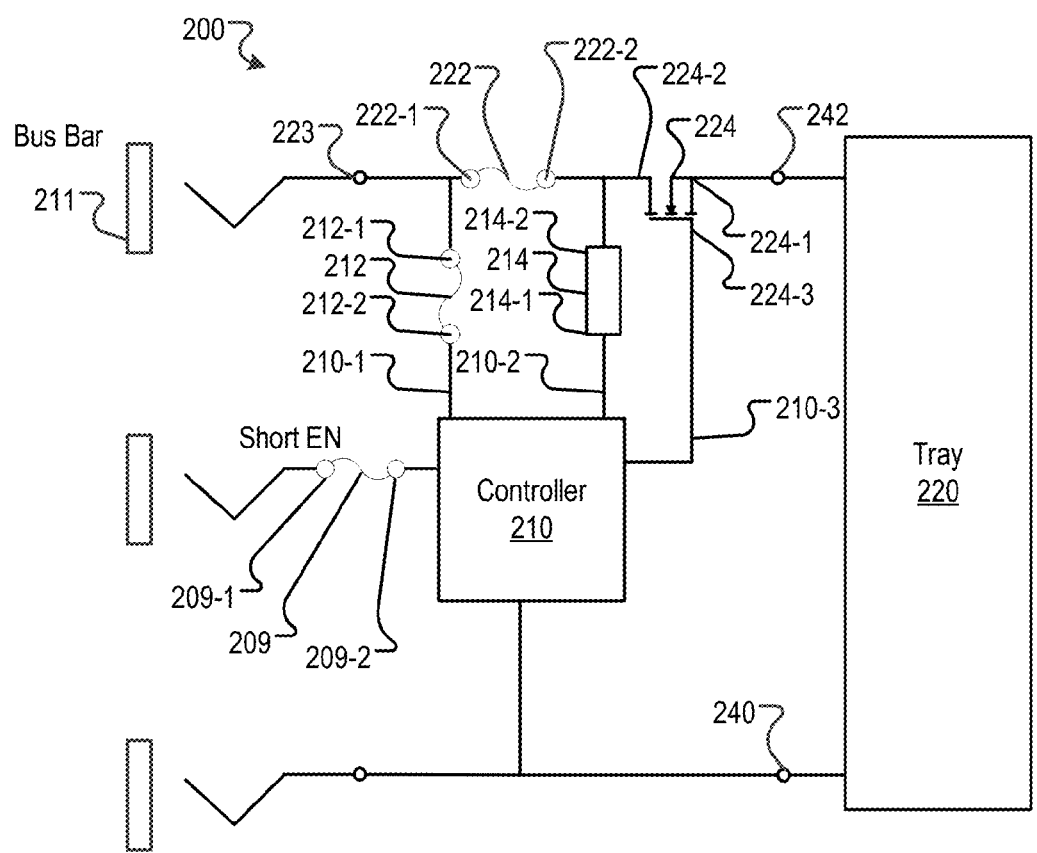
FIG. 2 is an example circuit diagram of a circuit that provides hot swap functionality and electrical protection for a data center facility.

FIG. 2 is an example circuit diagram of a circuit that provides hot swap functionality and electrical protection for a data center facility. The electrical circuit 200 is responsible for providing protection for a tray 220. Thus, the circuit 200 may be included in each tray receptacle of each rack 104.

The electrical circuit 200 also provides hot swap functionality for the tray 220. The bus bar 211 provides power to the electrical protection circuit 200 and other racks. In some implementations the bus bar provides a voltage of 48 V.

The controller 210 monitors the voltage between a positive sense terminal 210-1 and a negative sense terminal 210-2 to selectively connect and disconnect the bus bar 211 from the tray 220 by use of a switch 224 and control terminal 210-3. The voltage that is monitored is the voltage drop across a fuse 222 that is placed between the positive and negative sense terminals. The fuse 222 may be connected directly to the sense terminals 210-1 and 210-2, or electrically coupled by protective circuitry described in more detail below. A first terminal 222-1 of the fuse 222 is connected to the bus bar 211, and a second terminal 222-2 of the fuse is connected to the second terminal 224-2 of the switching device.

The positive and negative sense terminals 210-1 and 210-2 are typically connected to a differential amplifier (or other monitoring circuit with high input impedance). Because the fuse 222 impedance is on the order of magnitude of a typical sense resistor, use of the fuse 222 as a sense element eliminates the need for the sense resistor. Furthermore, the serial resistance that would otherwise result from placing the fuse between the terminal 223 and the bus bar 211 is eliminated. In some implementations, the internal resistance of the fuse 222 ranges from 1-2 milliohms.

The fuse 222 also provides electrical protection for the tray 220 and the switching device 224 by disconnecting the bus bar 211 from switching device 224 when the current through the fuse 222 exceeds a particular threshold. Additionally, the internal resistance of the fuse 222 is used to provide the voltage drop across the positive and negative sense terminals of the hot swap controller 210.

Placing fuse 222 between the positive and negative sense terminals 210-1 and 210-2 by direct connections to the first and second fuse terminals 222-1 and 222-2, however, leaves the positive sense 210-1 terminal unprotected. Accordingly, an additional fuse 212 is connected between the positive sense terminal 210-1 and first terminal 221-1 the fuse 222 by terminal 212-1 and 212-2, respectively. In the case, in which the positive and negative sense terminals provide a differential input, an electrical device 214 having an impedance that substantially matches the impedance of the fuse 212 is connected between the negative sense terminal and the fuse 222 in a similar manner. In some implementations, device 214 is a resistor. In other implementations, the device 214 is a fuse matched to the fuse 212. Having the matching impedances on each terminal 210-1 and 210-2 results in accurate monitoring of the voltage across fuse 222 by balancing the differential input. Furthermore, the combination of the fuses 212 and 222, which when they fail, fail to an open state, provides circuit protection for the controller 210 and the tray 220. In some implementation, fuse 209 similar to fuses 212 and 222 may be used to provide additional circuit protection for the controller 210 and the tray 220.

The switching device 224 is connected between the fuse 222 and the tray 220. A control input of the switching device 224 is connected to the hot swap controller 210. The hot swap controller provides a control signal to the switching device 224. In some implementations, the switching device is a transistor, such as a MOSFET transistor. The switching device selectively connects and disconnects the bus bar 211, coupled by the fuse 222, to the tray 220. For example, when the monitored voltage is below a particular threshold the switching device acts as a closed circuit, maintaining a connection between the bus bar 211 and the tray 220. However, when the monitored voltage exceeds the particular threshold the switching system acts as an open circuit, disconnecting the bus bar 211 from the tray 220. In some implementations, the state where the switching device is an open circuit is referred to as an open state, while the state where the switching device is a closed circuit is referred to as a closed state. The tray 220 may be a tray that houses cables that in turn provide power to a load, such as a computer, and is connected to the power bus 211 (though the monitoring circuit 200) by first and second load terminals 240 and 242.

As described above, high power systems benefit greatly from the reduction in the power path resistance, which directly translates to reduction in power consumption. In some implementations, the circuit of FIG. 2 may reduce the path of resistance 33% while remaining a completely fused and protected circuit.

The circuit 200 can be implemented in a variety of different ways. For example, in some implementations, the electrical device 214 may be omitted, and the controller is configured to account for the difference between the resistance connected to the first terminal and the resistance connected to the second terminal. In one implementation, the circuit 200 or portions of the circuit 200 may be integrated into the rack. In yet another implementation, the circuit 200 can be integrated into each rack slot.

Furthermore, other control circuits instead of the hot swap control circuit can be used to control the switching device 224. For example, a high impedance monitoring circuit can be connected in parallel with the hot swap control circuit and generate the output signal that controls the switching device 224. The output signal can be subject to a threshold voltage that is different from the threshold voltage at which the signal of the hot swap control circuit is generated.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments. Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
    first and second load terminals, the first load terminal configured to be in electrical connection with a first conductor of a power bus;
    a controller having a plurality of terminals comprising a first sense terminal, a second sense terminal, and a control terminal;
    a switching device having first and second terminals and a control input, the control input connected to the control terminal of the controller, and the first terminal connected to the second load terminal;
    a first fuse having a first resistance, and first and second terminals, the first terminal being connected to a second conductor of the power bus and the second terminal being connected to the second terminal of the switching device;
    wherein:
        the first sense terminal is coupled to the first terminal of the first fuse by a second fuse, and the second sense terminal is coupled to the second terminal of the first fuse; and
        the controller monitors a voltage across the first fuse and in response generates a control signal on the control input that selectively opens or closes the switching device such that the first and second terminals of the switching device are in electrical connection when the switching device is in a closed state, and are in electrical isolation from each other when the switching device is in an open state.

2. The apparatus of claim 1, wherein the second sense terminal is coupled to the second terminal of the first fuse by an electrical element having a same impedance as the second fuse.

3. The apparatus of claim 2, wherein the electrical element is a third fuse have a same impedance as the second fuse.

4. The apparatus of claim 2, wherein the electrical element is a resistor having a same impedance as the second fuse.

5. The apparatus of claim 1, wherein the power bus provides a voltage of 48 Volts.

6. The apparatus of claim 1, wherein the switching device is a transistor.

7. The apparatus of claim 1, wherein the controller is a hot swap controller.

8. A rack system, comprising:
    a plurality of rack slots configured to receive a corresponding electrical device, wherein each rack slot includes:
        first and second load terminals, the first load terminal configured to be in electrical connection with a first conductor of a power bus;
        a controller having a plurality of terminals comprising a first sense terminal, a second sense terminal, and a control terminal;
        a switching device having first and second terminals and a control input, the control input connected to the control terminal of the controller, and the first terminal connected to the second load terminal;
        a first fuse having a first resistance, and first and second terminals, the first terminal being connected to the power bus and the second terminal being connected to the second terminal of the switching device;
    wherein:
        the first sense terminal is coupled to the first terminal of the first fuse by a second fuse, and the second sense terminal is coupled to the second terminal of the first fuse; and
        the controller monitors a voltage across the first fuse and in response generates a control signal on the control input that selectively opens or closes the switching device such that the first and second terminals of the switching device are in electrical connection when the switching device is in a closed state, and are in electrical isolation from each other when the switching device is in an open state.

9. The system of claim 8, wherein the second sense terminal is coupled to the second terminal of the first fuse by an electrical element having a same impedance as the second fuse.

10. The system of claim 9, wherein the electrical element is a third fuse have a same impedance as the second fuse.

11. The system of claim 9, wherein the electrical element is a resistor having a same impedance as the second fuse.

12. The system of claim 8, wherein the power bus provides a voltage of 48 Volts.

13. The system of claim 8, wherein the switching device is a transistor.

14. The system of claim 8, wherein the controller is a hot swap controller.

* * * * *